United States Patent
Lindoff et al.

(10) Patent No.: US 11,528,624 B2
(45) Date of Patent: Dec. 13, 2022

(54) RECEIVING DEVICE AND A METHOD THEREOF

(71) Applicant: Huawei Technologies Co., Ltd., Shenzhen (CN)

(72) Inventors: Bengt Lindoff, Kista (SE); Chaitanya Tumula, Kista (SE); Neng Wang, Kista (SE); Wenquan Hu, Lund (SE); Johan Uden, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 253 days.

(21) Appl. No.: 16/779,026

(22) Filed: Jan. 31, 2020

(65) Prior Publication Data
US 2020/0169901 A1 May 28, 2020

Related U.S. Application Data

(63) Continuation of application No. PCT/EP2017/069418, filed on Aug. 1, 2017.

(51) Int. Cl.
*H04W 4/00* (2018.01)
*H04W 24/08* (2009.01)
*H04W 72/04* (2009.01)

(52) U.S. Cl.
CPC ....... *H04W 24/08* (2013.01); *H04W 72/0406* (2013.01)

(58) Field of Classification Search
CPC .............. H04W 24/08; H04W 72/0406; H04L 1/1812; H04L 1/20; H04B 7/0617
USPC .......................... 370/252, 329–330, 335–345
See application file for complete search history.

(56) References Cited

U.S. PATENT DOCUMENTS

| | | | |
|---|---|---|---|
| 8,995,366 B2 | 3/2015 | Nimbalker et al. | |
| 10,623,971 B2* | 4/2020 | Rune | H04B 7/0695 |
| 10,812,155 B2* | 10/2020 | da Silva | H04B 7/0417 |
| 2013/0250782 A1* | 9/2013 | Nimbalker | H04L 1/203 370/252 |
| 2013/0308481 A1* | 11/2013 | Kazmi | H04W 24/02 370/252 |
| 2014/0204781 A1* | 7/2014 | Horvat | H04W 24/00 370/252 |

(Continued)

FOREIGN PATENT DOCUMENTS

| | | |
|---|---|---|
| CN | 1882183 A | 12/2006 |
| CN | 102356658 A | 2/2012 |

(Continued)

OTHER PUBLICATIONS

"Beam recovery in NR," 3GPP TSG-RAN WG2 #Ad Hoc, R2-1706950, Qingdao, China, total 4 pages, 3rd Generation Partnership Project, Valbonne, France (Jun. 27-29, 2017).

(Continued)

*Primary Examiner* — Thai D Hoang
(74) *Attorney, Agent, or Firm* — Leydig, Voit & Mayer, Ltd.

(57) ABSTRACT

A receiving device for a wireless communication system, is configured to: monitor a reference signal associated with a control channel, the control channel being associated with a serving beam link; determine a channel quality measure based on the reference signal; and declare a beam link failure for the serving beam link based on the channel quality measure and a configuration of the control channel.

18 Claims, 7 Drawing Sheets

(56) References Cited

U.S. PATENT DOCUMENTS

| | | | | |
|---|---|---|---|---|
| 2018/0278467 | A1* | 9/2018 | Wilson et al. | H04W 72/046 |
| 2018/0302889 | A1* | 10/2018 | Guo | H04B 7/0617 |
| 2019/0200249 | A1* | 6/2019 | Yoon | H04L 5/0057 |
| 2020/0028603 | A1* | 1/2020 | Wang | H04L 5/0051 |
| 2020/0059404 | A1* | 2/2020 | Liu | H04L 41/0806 |

FOREIGN PATENT DOCUMENTS

| | | | | |
|---|---|---|---|---|
| EP | 3783809 A1 * | 2/2021 | | H04B 7/0695 |
| WO | WO-2017151876 A1 * | 9/2017 | | H04B 7/0408 |
| WO | WO-2018174806 A1 * | 9/2018 | | H04L 5/0023 |

OTHER PUBLICATIONS

"RLM/RLF for NR," 3GPP TSG-RAN WG2 Ad Hoc, R2-1706691, Qingdao, China, total 4 pages, 3rd Generation Partnership Project, Valbonne, France (Jun. 27-29, 2017).

"Beam recovery in NR," 3GPP TSG-RAN WG2 #Ad Hoc, Qingdao, China, Tdoc R2-1706950, XP051301447, pp. 1-4, 3rd Generation Partnership, Project, Valbonne, France (Jun. 27-29, 2017).

"WF on Beam Failure Recovery," 3GPP TSG RAN WG1 Meeting #88b, Spokane, USA, R1-1706633, pp. 1-6, 3rd Generation Partnership, Project, Valbonne, France (Apr. 3-7, 2017).

"3rd Generation Partnership Project; Technical Specification Group Radio Access Network; NR; Physical layer procedures for control (Release 15)," 3GPP TS 38.213 V0.0.1, pp. 1-14, 3rd Generation Partnership, Project, Valbonne, France (Jul. 2017).

"RLM/RLF for NR," 3GPP TSG-RAN WG2 Ad Hoc, Qingdao, China, R2-1706691, XP051301191, pp. 1-4, 3rd Generation Partnership, Project, Valbonne, France (Jun. 27-29, 2017).

"3rd Generation Partnership Project; Technical Specification Group Radio Access Network; NR; Medium Access Control (MAC) protocol specification (Release 15)," 3GPP TS 38.321 V0.0.4, pp. 1-31, 3rd Generation Partnership, Project, Valbonne, France (Jun. 2017).

"3rd Generation Partnership Project; Technical Specification Group Radio Access Network; NR; Radio Resource Control (RRC); Protocol specification (Release 15)," 3GPP TS 38.331 V0.0.5, pp. 1-38, 3rd Generation Partnership, Project, Valbonne, France (Aug. 2017).

"Draft of TS38.133 v0.0.1," 3GPP TSG-RAN WG4 Meeting #83, Hangzhou, China, R4-1704696, one page, 3rd Generation Partnership, Project, Valbonne, France (May 15-19, 2017).

"3rd Generation Partnership Project; Technical Specification Group Radio Access Network; NR; Physical channels and modulation (Release 15)," 3GPP TS 38.211 V0.1.1, pp. 1-36, 3rd Generation Partnership, Project, Valbonne, France (Jul. 2017).

* cited by examiner

RECEIVING DEVICE AND A METHOD THEREOF

CROSS-REFERENCE TO RELATED APPLICATIONS

This application is a continuation of International Application No. PCT/EP2017/069418, filed on Aug. 1, 2017, the disclosure of which is hereby incorporated by reference in its entirety.

TECHNICAL FIELD

The disclosure relates to a receiving device and a corresponding method. Furthermore, the disclosure also relates to a client device including such as a receiving device and a computer program.

BACKGROUND

The 5 g cellular system, also called New Radio (NR), is currently being standardized. New Radio based on Orthogonal Frequency Division Multiplexing (OFDM) is targeting radio spectrum from below 1 GHz up to and above 60 GHz. In order to allow for such diverse radio environments, not only different system bandwidths will be supported, but also different numerologies, such as different sub-carrier spacing (SCS). Furthermore, for carriers over 10 GHz, multiple antennas and beamforming are assumed to be used in order to combat higher path loss at such high radio frequencies.

In beamforming, the next generation Node B (gNode B) transmission and reception point (TRP) may transmit data in several directions in different transmission beams. The User Equipment (UE) therefore has to tune its own receive antennas in different reception beam directions so as to communicate with the gNode B. However, in order for the UE to be able to detect and track transmission beams, the UE needs to perform beam monitoring. Hence, a transmission and reception point on a regular basis transmits known reference signals in adjacent transmission beams, and the UE has to scan after the transmission beams to detect them, e.g. for possible beam switching in case of changes in the radio environment. Each possible connection between the UE and the transmission and reception point is called a beam pair link (BPL), which includes of the best match between the transmission beams and reception beams. The principles behind beam monitoring can be compared to the cell search in legacy Long Term Evolution (LTE), Wideband Code Division Multiple Access (WCDMA) and High Speed Packet Access (HSPA) systems. In such systems the UE on a regular basis need to scan neighbouring cells for possible handover candidates.

The transmission and reception point will configure a set of BPLs for the UE to monitor and to maintain the connection with the network. Such a set may be denoted as SM={BPL1, BPL2, ..., BPLN}, where N≥1. The configured beam pair link to monitor may be based on which beam pair link the UE has detected. This set can e.g. include of all the beam pair links associated with control and data channels between the transmission and reception point and the UE. The transmission and reception point will also configure a set of serving beam pair links which will transmit the associated control information to the UE. This set may be denoted as SS={SBPL1, SBPL2, ..., SBPLM}, where M≥1, and is a subset to or equal to the set SM. The UE monitors the quality of serving beam pair links to decide if there is a beam link failure between the transmission and reception point and the UE.

In the earliest releases of LTE not supporting machine type communication modes the system bandwidth for the eNode B and UE was the same. However, New Radio supports up to 100 MHz, and the gNode B transmission bandwidth and the UE receiver bandwidth may not be the same. Hence, in New Radio the UE can be configured to monitor a small control channel bandwidth. Therefore, the concept of BandWidthParts (BWP) has been introduced in New Radio. The gNode B configures the UE with different BWPs, e.g. small bandwidths used for power saving and large bandwidths for high data throughput. The BWPs is defined in Physical Resource Blocks (PRBs) and the UE is informed about which PRBs to monitor. Therefore, with the concept of BWPs the UE may monitor control channels having different bandwidths.

Moreover, the UE in New Radio is configured to monitor at least one serving beam link pair associated with a control channel (such as e.g. Physical Downlink Control Channel (PDCCH)) with a certain configured bandwidth. The configuration is made by the gNode B in a setup procedure. The control channel in New Radio may be either a common control channel, i.e. a control channel monitored by several UEs or a UE specific control channel CCH. Once data is allocated to the UE, the control channel includes control information, such as scheduling information containing resource allocation, Modulation and Coding Scheme (MCS) information, Hybrid Automatic Repeat Request (HARQ), etc. for the associated downlink data channel (such as e.g. Physical Downlink Shared Channel (PDSCH)). In case of small amount of data, the corresponding data channel to be decoded can use the same configured UE receiver bandwidth as the control channel. In case the data requires larger bandwidth allocation, this is informed in the control channel to the UE and the UE retunes its radio receiver. Then the UE reconfigures for small reception bandwidth for power saving and continues monitoring the small bandwidth control channel. However, in order for the UE to keep track of beam link pairs, the UE need to monitor signal strengths of all the configured beam link pairs, e.g. from the set SM. The gNode B configures the UE with a bandwidth where the reference signal should be measured. Thereafter, reference signals or pilot symbols are transmitted at time instances from the different beams, and the UE adapts its radio receiver accordingly so as to receive the reference signals and estimate the signal strength for each beam (serving as well as monitoring beams). The reference signal bandwidth may typically be wider than the small control channel bandwidth since the gNode B should have knowledge of the entire bandwidth for determining the correct MCS when transmitting a large amount of data to the UE.

Radio link monitoring is also used in LTE and the quality should be measured in terms of reliable detection of a PDCCH, for instance the PDCCH Block Error Rate (BLER) should be below a threshold, e.g. 1% or 10%. However, since the UE typically does not receive any PDCCH in a single frame a hypothetical PDCCH BLER is derived based on a measured Signal to Interference and Noise Ratio (SINR) determined from reference signals. The UE then determines whether the radio link is so called in-sync. or out-of-sync. in layer 1. In case of out-of-sync. the UE performs certain layer 3 tasks, such as declares radio link failure, and starts a connection re-establishment procedure. Similar techniques for beam link monitoring and beam link failure detection is to be defined for New Radio.

SUMMARY

Embodiments of the present disclosure provide a solution that mitigates or solves the drawbacks and problems of conventional solutions.

According to a first aspect of the disclosure, such improvements are achieved with a receiving device for a wireless communication system, the receiving device being configured to:

monitor a reference signal associated with a control channel, the control channel being associated with a serving beam link;

determine a channel quality measure based on the reference signal; and declare a beam link failure for the serving beam link based on the channel quality measure and a configuration of the control channel.

The association between the reference signal and the control channel, in New Radio, may be that the reference signal is Quasi Co-Located (QCL) with the control channel. This means that the receiving device can assume that the reference signal and the control channel are transmitted from the same antenna port or beam. Hence, the radio channel quality is expected to be similar for the reference signal RS as for the control channel.

To determine the channel quality measure based on the reference signal may mean that the channel quality measure is computed using a representation of the reference signal, e.g. in an algorithm for such computations. However, other methods can also be employed to determine the channel quality, such as the use of look up tables, specific mapping methods and functions, hardware implementations, etc.

A beam link failure for a serving beam link can be understood as a situation when the quality of the serving beam link is so low that control information transmitted on an associated control channel cannot be reliably detected. A beam link failure for a serving beam link can trigger a beam link failure recovery procedure or any other suitable procedure. Such procedures are generally defined in communication standards.

The receiving device according to the first aspect provides a number of advantages over conventional solutions. By also considering the configuration of the control channel a more reliable solution for declaring beam link failure is provided compared to conventional solutions. A more reliable solution can herein mean that the declaration of a beam link failure according to embodiments of the disclosure is made at a radio channel condition that more truly corresponds to radio channel quality in which decoding of the control channel is unreliable compared to conventional solutions.

In an implementation form of a receiving device according to the first aspect, the receiving device is configured to declare the beam link failure for the serving beam link based on a comparison of the channel quality measure to a channel quality threshold value The channel quality threshold value is dependent on the configuration of the control channel.

By comparing the channel quality measure with the channel quality threshold value, a low complex and effective solution for declaring beam link failure is provided.

In an implementation form of a receiving device according to the first aspect, the receiving device is configured to:

determine a hypothetical error rate for the control channel based on the channel quality measure and the configuration of the control channel; and declare the beam link failure for the serving beam link based on the hypothetical error rate for the control channel.

An advantage with this implementation form is that by using a hypothetical error rate for the control channel an even more reliable solution for declaring a beam link failure is provided.

In an implementation form of a receiving device according to the first aspect, the receiving device is configured to declare the beam link failure for the serving beam link based on a comparison of the hypothetical error rate to an error rate threshold value.

An advantage with this implementation form is that, by using an error rate threshold value, a low complex and effective solution for declaring beam link failure is provided.

In an implementation form of a receiving device according to the first aspect, the error rate threshold value is dependent on the configuration of the control channel.

An advantage with this implementation form is that, since the error rate threshold value is dependent on the configuration of the control channel, a very reliable threshold value is provided.

In an implementation form of a receiving device according to the first aspect, the hypothetical error rate is a hypothetical block error rate for the control channel.

The hypothetical block error rate is a good measure to use for declaring a beam link failure.

In an implementation form of a receiving device according to the first aspect, the control channel is associated with a plurality of serving beam links. Here, the receiving device is configured to declare the beam link failure for the plurality of serving beam links further based on the number of serving beam links in the plurality of serving beam links associated with the control channel.

An advantage with this implementation form is that, since the number of serving beam links are considered, an even more reliable solution for declaring beam link failure is provided.

In an implementation form of a receiving device according to the first aspect, the receiving device is configured to declare the beam link failure for the serving beam link further based on the frequency range of the reference signal.

The frequency range in this disclosure relates to a bandwidth. That is, a frequency range has a certain bandwidth.

In this implementation form, the actual frequency range of the reference signal is considered. Therefore, an even more reliable solution for declaring beam link failure is provided.

In an implementation form of a receiving device according to the first aspect, the receiving device is configured to monitor the reference signal in the same frequency range as the frequency range of the control channel.

By monitoring the reference signal in the same frequency range as the frequency range of the control channel, a one to one mapping is provided. This has the advantage that the channel quality is estimated over same frequency range as the control channel giving a more reliable beam link failure declaration.

In an implementation form of a receiving device according to the first aspect, the receiving device is configured to:
receive an instruction to monitor the reference signal in an updated frequency range; and monitor the reference signal in the updated frequency range in response to receiving the instruction.

An advantage with this implementation form is that the receiving device can be remotely configured to monitor updated frequency ranges. Therefore, the channel quality is estimated over currently configured control channel giving a more reliable beam link failure declaration.

In an implementation form of a receiving device according to the first aspect, the receiving device is configured to declare the beam link failure for the serving beam link further based on a service class associated with the serving beam link.

By the also considering the service class associated with the serving beam link, an even more reliable solution for declaring beam link failure is provided. Moreover, the declaration is also adapted to different service classes which have different requirements. For example, for a highly critical services class, a beam link failure threshold maybe set more conservative than for a non-critical service class.

In an implementation form of a receiving device according to the first aspect, the configuration of the control channel is at least one of a frequency range of the control channel and a transmission scheme of the control channel.

These two different configuration aspects of the control channel are important for determining beam link failure. By considering the frequency range a more reliable beam link failure detection is achieved. By considering the transmission scheme of the control channel a more reliable solution for determining beam link failure is provided.

In an implementation form of a receiving device according to the first aspect, the channel quality measure is at least one of: a Signal-to-Interference and Noise Ratio, a Reference Signal Received Quality, and a Reference Signal Received Power.

The above mentioned metrics are suitable quality measures to be used in conjunction with the receiving device according to the first aspect.

In an implementation form of a receiving device according to the first aspect, the reference signal is at least one of: Channel State Information Reference Symbols, Demodulation Reference Signals for New Radio Physical Downlink Control Channel, DMRS for New Radio Physical Broadcast Channel, New Radio Secondary Synchronization Signals, New Radio Primary Synchronization Signals, and reference symbols for at least one of time and frequency tracking.

The above mentioned reference signals are suitable reference signals to be used in conjunction with the receiving device according to the first aspect.

In an implementation form of a receiving device according to the first aspect, the control channel is a physical downlink control channel.

According to this implementation form it is the physical downlink control channel that should be considered.

According to a second aspect of the disclosure, the above mentioned and other improvements are achieved with a client device for a wireless communication system, the client device including a receiving device according to any of the implementation forms of the first aspect or to the first aspect as such.

In an implementation form of a client device according to the second aspect, the control channel is a common control channel for a plurality of client devices or a dedicated control channel for a single client device.

This implementation form can therefore be adapted to different control channel types.

In an implementation form of a client device according to the second aspect, the serving beam link is a beam pair link including a transmission beam of a remote transmission point and a corresponding receiving beam of the client device.

According to a third aspect of the disclosure, the above mentioned and other objectives are achieved with a method for a receiving device. The method includes:

monitoring a reference signal associated with a control channel, where the control channel is associated with a serving beam link;

determining a channel quality measure based on the reference signal; and declaring a beam link failure for the serving beam link based on the channel quality measure and a configuration of the control channel.

The method according to the third aspect can be extended into implementation forms corresponding to the implementation forms of the receiving device according to the first aspect. Hence, an implementation form of the method includes the feature(s) of a corresponding implementation form of the receiving device.

The advantages of the methods according to the third aspect are the same as those for the corresponding receiving device according to the first aspect.

Embodiments of the disclosure also relates to a computer program, characterized in code means, which when run by processing means causes the processing means to execute any method according to the present disclosure. Further, embodiments of the disclosure also relate to a computer program product including a computer readable medium and the mentioned computer program, where the computer program is included in the computer readable medium, and includes of one or more from the group: ROM (Read-Only Memory), PROM (Programmable ROM), EPROM (Erasable PROM), Flash memory, EEPROM (Electrically EPROM) and hard disk drive.

Further applications and advantages of embodiments of the present disclosure will be apparent from the following detailed description.

BRIEF DESCRIPTION OF THE DRAWINGS

The appended drawings are intended to clarify and explain different embodiments of the present disclosure, in which.

DETAILED DESCRIPTION

Figure 1:
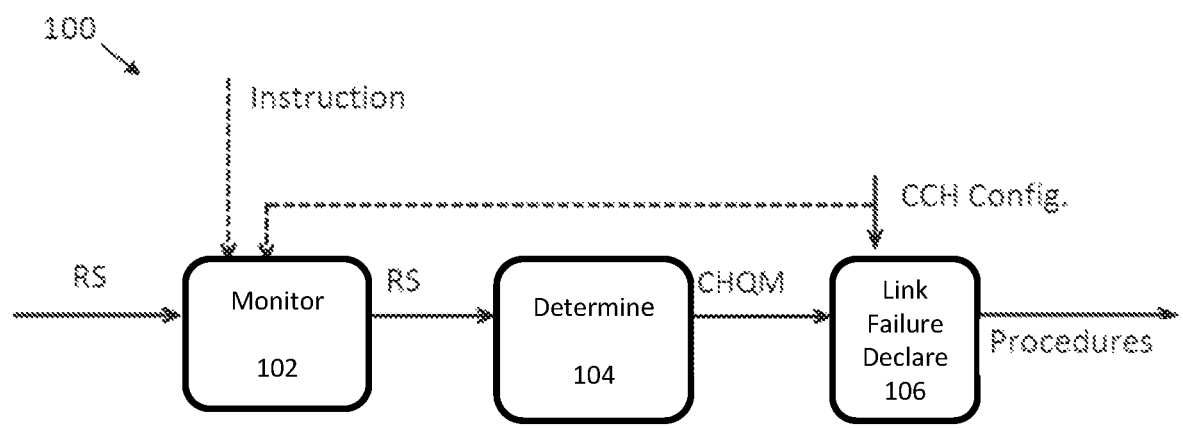
FIG. 1 illustrates a receiving device according to an embodiment of the disclosure.

FIG. 1 illustrates a receiving device 100 according to an embodiment of the disclosure. The receiving device 100 in FIG. 1 includes a monitoring block 102, a determining block 104, and a link failure declaring block 106 connected to each other, as illustrated in FIG. 1. A reference signal RS is monitored by the monitoring block 102. The monitored reference signal RS is associated with a control channel, which in turn is associated with at least one serving beam link. The determination block 104 determines a channel quality measure CHQM based on the monitored reference signal RS, which is forwarded by the monitoring block 102 to the determination block 104. The determination block 104 thereafter forwards the determined channel quality measure CHQM to the link failure declaring block 106. Finally, the link failure declaring block 106 declares a beam link failure for the serving beam link based on the determined channel quality measure CHQM and a configuration of the control channel CCH, as illustrated with the arrows in FIG. 1.

When a beam link failure is declared, different procedures may optionally be triggered, which is illustrated with the outbound arrow from the link failure declaring block 106 in FIG. 1. For example, if a beam link failure is declared for the serving beam link, the receiving device 100 can be configured to start a general beam recovery procedure. In case there are no other reliable beam pair links in the monitored set of beam pair links, which means that a beam pair link recovery procedure has failed, the receiving device 100 can declare a radio link failure (so called out-of-sync.) and start a radio link re-establishment procedure. Other procedures in response to a beam link failure are possible, and such procedures are often predefined in communication standards, e.g. in LTE and New Radio.

It is to be understood that the receiving device 100 herein may be implemented with the functional blocks 102, 104, 106, as illustrated in FIG. 1. However, the receiving device 100, and therefore the functional blocks 102, 104, 106 according to an embodiment of the disclosure, will typically be implemented in a processor(s), such that the processor is configured to execute the actions or corresponding steps and functions performed and illustrated by the mentioned blocks in FIG. 1. The functional blocks could for example represent different sections of a program code running on the processor.

FIG. 1 also shows an optional dashed arrow illustrating configurations of the control channel CCH as input to the monitoring block 102. Thereby, the monitoring can be dependent on the mentioned configurations of the control channel CCH. For example, the configuration of the control channel CCH can be a frequency range of the reference signal RS to be monitored.

Optionally, the receiving device 100 can also be configured to receive an instruction to monitor the reference signal RS in an updated frequency range. This is illustrated with the dashed arrow labelled "Instruction" as input to the monitoring block 102. In response to reception of the instruction, the receiving device 100 monitors the reference signal RS in the updated frequency range.

The configuration of the control channel CCH generally relates to different transmission aspects or modes of the control channel CCH. At least a frequency range of the control channel CCH and/or a transmission scheme of the control channel CCH relates to the configuration of the control channel CCH. The mentioned configuration of the control channel CCH may be used in mapping functions so as to declare a beam link failure or not. Such a mapping function is generally a mapping function, which takes one or more inputs and provides one or more outputs. For example, herein a mapping function may map a SINR value (i.e. one input) to a BLER value (i.e. one output). In another example, a mapping function may map a SINR value, a control channel CCH frequency range, and a transmission scheme (i.e. a multiple of inputs) to a BLER value (i.e. one output).

Since different control channel CCH frequency ranges may correspond to different encoded control channels CCHs, the mapping function may be different for different configured control channel CCH frequency ranges. Further, the mapping function may be dependent on the transmission scheme of the control channel CCH. The mapping functions may be determined beforehand based on lab experiments and stored in a look-up table in the receiving device 100. In other implementations, a network node or a remote server may configure the receiving device 100 with different mapping functions. In further implementations of the disclosure the mapping functions may be dependent on the deployment scenarios of base stations or other network access nodes.

Moreover, the mentioned reference signal RS is associated with the serving beam link. Many types of reference signals RSs can be employed. Following reference signals RSs types are suitable and can be used in implementations of the disclosure: Channel State Information Reference Symbols (CSI-RS), Demodulation Reference Signals (DMRS) for New Radio Physical Downlink Control Channel (NR-PDCCH), DMRS for New Radio Physical Broadcast Channel (NR-PBCH), New Radio Secondary Synchronization Signals (NR-SSS), New Radio Primary Synchronization Signals (NR_PSS), and reference symbols for at least one of time and frequency tracking. However, other reference signals RSs types may be used.

Furthermore, in order to obtain the channel quality measure CHQM based on the reference signal RS, filtering can be applied on samples of the reference signal RS. In this respect, samples of the reference signal RS are used for determining snap shots of the channel quality measure CHQM. Mentioned snap shots are thereafter filtered in order to obtain the channel quality measure CHQM used for beam failure detection. Non-limiting examples of different filtering techniques that may be employed are: averaging, Finite Impulse Response (FIR) filtering, and Infinite Impulse response (IIR) filtering.

Furthermore, the channel quality measure CHQM herein may be at least one of: a Signal-to-Interference and Noise Ratio (SINR), a Reference Signal Received Quality (RSRQ), and a Reference Signal Received Power (RSRP). However, also other channel quality measures can be used in conjunction with embodiments of the disclosure. For example, the RSRP/RSRQ may be based on methods used for computing the similar metric in the LTE standards Layer 3 mobility, including a Layer 1 filter and a Layer 3 filter. In other implementations, only a Layer 1 filtered version of the RSRP/RSRQ (i.e. L1-RSRP) is used, meaning that higher layer signaling or processing is not used in the determination of the channel quality measure CHQM.

Figure 2:
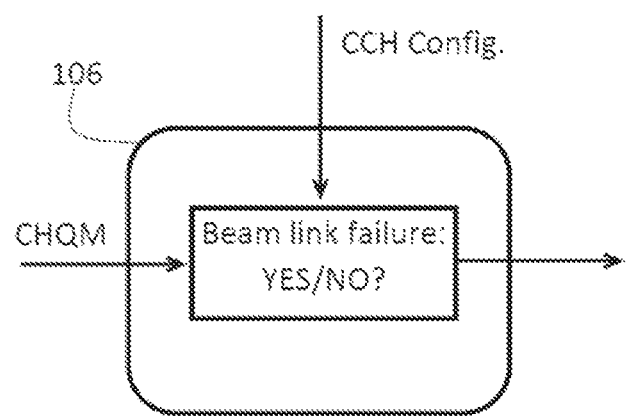
FIG. 2 shows a declare beam link failure block according to an embodiment of the disclosure.

FIG. 2 illustrates a possible implementation of the link failure declaring block 106 shown in FIG. 1. It is shown in FIG. 2 how the channel quality measure CHQM and the configuration of the control channel CCH is received as inputs to the link failure declaring block 106. Based on the mentioned inputs, the link failure declaring block 106 declares whether a beam link failure has occurred or not for the serving beam link, i.e. YES or NO.

In an implementation, the receiving device 100 is configured to declare the beam link failure for the serving beam link based on a comparison of the channel quality measure CHQM to a channel quality threshold value. This implies that a beam link failure is declared if the channel quality measure CHQM is less than the channel quality threshold value. The value of the threshold may vary, e.g. depending on the supported service. For example, a high reliability service may require a high channel quality threshold value, whilst for other services, a lower channel quality threshold value may be enough. Hence, the channel quality threshold value can be dependent on the configuration of the control channel CCH.

Table 1 illustrates an example in which different configurations of the control channel CCH are associated with different SINR threshold values. In Table 1, different control channel CCH configurations Q1, Q2, Q3, and Q4 have corresponding SINR threshold values 5, 2, 0, and −3 dB, respectively. The different control channel CCH configurations, i.e. Q1, Q2, Q3, and Q4, may e.g. relate to different frequency ranges and/or different transmission schemes of the control channel CCH.

TABLE 1

| CCH configuration | SINR threshold |
|---|---|
| Q1 | 5 dB |
| Q2 | 2 dB |
| Q3 | 0 dB |
| Q4 | −3 dB |

Figure 3:
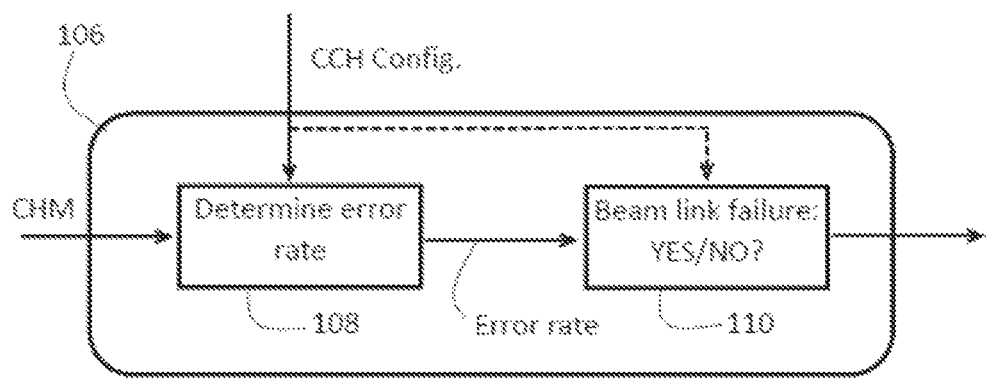
FIG. 3 shows a declare beam link failure block according to another embodiment of the disclosure.

FIG. 3 illustrates another possible implementation of the link failure declaring block 106, including a first sub-block 108 and a second sub-block 110. It is shown in FIG. 3 how the channel quality measure CHQM and the configuration of the control channel CCH are received as inputs to the link failure declaring block 106. In contrast to the implementation of FIG. 2, in this implementation an error rate for the control channel CCH is first determined based on the received channel quality measure CHQM and the configuration of the control channel CCH in the first sub-block 108. Thereafter, based on the determined error rate for the control channel CCH, the second sub-block 110 declares whether a beam link failure has occurred or not for the serving beam link, i.e. YES or NO. Hence, according to this implementation, the configuration of the control channel CCH is used as an input in the determination of the error rate in the first sub-block 108, which is then used as basis for the declaration of the beam link failure.

The error rate for the control channel CCH relates to the decoding reliability of the control channel CCH. A suitable measure is the hypothetical error rate for the control channel CCH. Therefore, the receiving device 100 can be configured to declare a beam link failure for the serving beam link based on a comparison of the hypothetical error rate to an error rate threshold value, which can be chosen dependent on the configuration of the control channel CCH. In other words, for a first control channel configuration a first error rate threshold value (e.g. a BLER threshold) can be chosen or set and for a second control channel configuration a second (e.g. lower) error rate threshold value can be chosen or set. For example, assuming the first control channel configuration relates to a machine to machine (M2M) service and the second control channel configuration relates to a vehicle to vehicle (V2V) service. In this case, the first error rate threshold value for M2M service may be chosen higher (e.g. 10% BLER) than the second error rate threshold value (e.g. 1% BLER) for V2V service. One should mention that, nevertheless, the mapping curves between signal quality and error rate threshold may be the same for both mentioned control channel configurations, e.g. because they use the same frequency range and/or code rate. In other words, the second sub-block 110 is configured to declare the beam link failure for the serving beam link based on the hypothetical error rate for the control channel CCH and the configuration of the control channel CCH which is illustrated with the dashed (optional) arrow in FIG. 3. Hence, in this case the hypothetical error rate is used in conjunction with the configuration of the control channel CCH for declaring a beam link failure or not. To summarize, in such an implementation the control channel configuration can be used for choosing the corresponding channel quality (SINR) to hypothetical error rate (BLER) mapping curve (in sub-block 108) and furthermore for determining the error rate threshold value above which a beam link failure would be declared (in sub-block 110).

Figure 7:
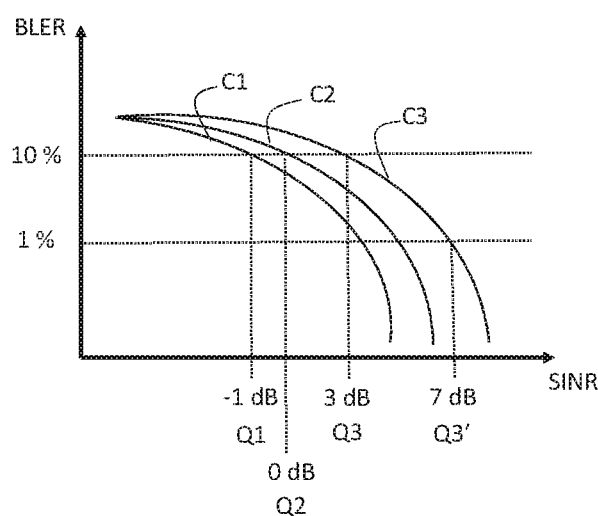
FIG. 7 illustrates different mapping curves and different configurations of control channel.

FIG. 7 together with Table 2 exemplarily illustrate the relation between configuration of the control channel CCH, associated BLER threshold above which beam link failure would be declared, corresponding SINR value and mapping curve. Different configurations of the control channel CCH are denoted Q1, Q2, Q3 and Q3'. Furthermore, the three mapping curves in this example are denoted C1, C2, and C3. In FIG. 7 two different BLER values are shown, namely 10% and 1%. The following can be noted from FIG. 7 in conjunction with Table 2:

- For control channel CCH configuration Q1 a BLER threshold of 10% is set. In addition, mapping curve C1 is considered for control channel CCH configuration Q1 resulting in an SINR value of −1 dB for the corresponding BLER threshold of 10%.
- For control channel CCH configuration Q2 a BLER threshold of 10% is set. In addition, mapping curve C2 is considered for control channel CCH configuration Q2 resulting in an SINR value of 0 dB for the corresponding BLER threshold of 10%.
- For control channel CCH configuration Q3 a BLER threshold of 10% is set. In addition, mapping curve C3 is considered for control channel CCH configuration Q3 resulting in an SINR value of 3 dB for the corresponding BLER threshold of 10%.
- For control channel CCH configuration Q3' a BLER threshold of 1% is set. In addition, mapping curve C3 is considered for control channel CCH configuration Q3' resulting in an SINR value of 7 dB for the corresponding BLER threshold of 10%.

It is noted that the channel configurations Q3 and Q3' relate to different control channel CCH configurations but use the same mapping curve, i.e. C3. For example, control channel CCH configuration Q3 could be associated with a more relaxed service class (accepting a higher BLER) compared to control channel CCH configuration Q3' but could relate to the same frequency range. Hence, control channel CCH configuration Q3' can only tolerate a lower BLER when compared to CCH configuration Q3 but still use the same mapping curve. Hence, control channel CCH configuration Q3' could relate to a more demanding service class for than the other mentioned control channel CCH configurations.

Further, control channel CCH configurations Q1, Q2, Q3 and Q3' could relate to different frequency ranges, especially for control channel CCH configurations having different mapping curves.

The mapping curves C1, C2, and C3 shown in FIG. 7 can be understood as representing different mapping functions which has been discussed previously. Of course, also any other intermediate value between SINR and BLER threshold can be derived from such mapping curves.

TABLE 2

| CCH configuration | BLER threshold | SINR Value | Mapping curve |
|---|---|---|---|
| Q1 | 10% | −1 dB | C1 |
| Q2 | 10% | 0 dB | C2 |

TABLE 2-continued

| CCH configuration | BLER threshold | SINR Value | Mapping curve |
|---|---|---|---|
| Q3 | 10% | 3 dB | C3 |
| Q3' | 1% | 7 dB | C3 |

Figure 4:
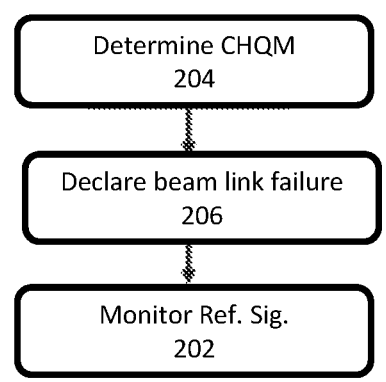
FIG. 4 shows a method according to an embodiment of the disclosure.

FIG. 4 shows a flow chart of a general method according to an embodiment of the disclosure. The method 200 may be executed in a receiving device 100 according to the disclosure. The method 200 fully corresponds to the receiving device 100 shown in FIG. 1. The method 200 includes monitoring 202 a reference signal RS associated with a control channel CCH which in turn is associated with a serving beam link. The method 200 further includes determining 204 a channel quality measure CHQM based on the reference signal RS. The method 200 further includes declaring 206 a beam link failure for the serving beam link based on the channel quality measure CHQM and a configuration of the control channel CCH.

Figure 5:
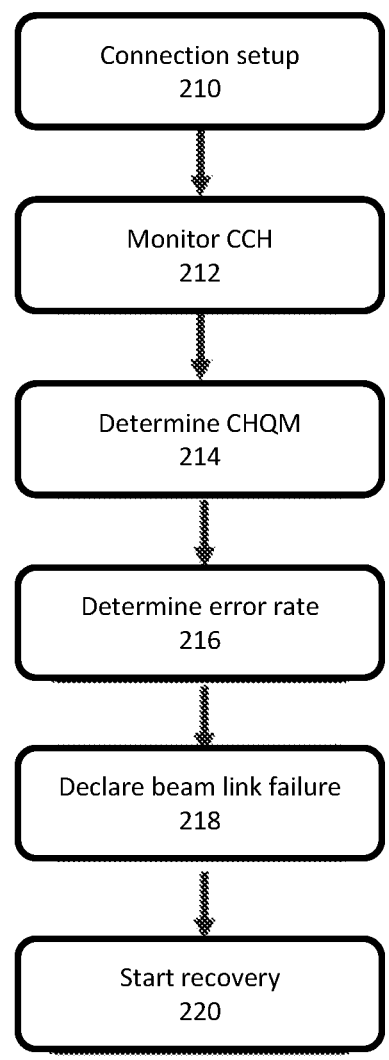
FIG. 5 shows a method according to another embodiment of the disclosure.

FIG. 5 shows a flow chart of a further method 200' according to an embodiment of the disclosure. The method 200' in FIG. 5 includes steps 210 to 220:

At 210 the receiving device 100 performs a connection setup procedure towards a remote base station or its transmission and reception points and receives control information on a control channel CCH needed for beam link monitoring. Such control information may relate to one or more configurations of the control channel CCH, such as monitoring frequency range and centre frequencies of the control channel CCH, transmission scheme of the control channel CCH, frequency range and centre frequencies of the reference signal RS, control channel CCH Discontinuous Reception Mode (DRX) cycle parameters, reference signal RS transmission time instances for the serving beam link(s), and reference signal RS transmission time instances for neighbouring beam link(s). The control channel CCH may be a common control channel monitored by a plurality of receiving devices. However, in another example the control channel CCH may be a dedicated control channel only for a specific receiving device.

At 212 the receiving device 100 monitors the control channel CCH for possible data reception as well as monitors the reference signal RS for the serving beam link which includes a transmission beam and a reception beam, i.e. a serving beam pair link and monitoring beams.

At 214 a channel quality measure CHQM is determined based on the monitored reference signal RS over a frequency range substantially corresponding to the frequency range of the control channel CCH. The channel quality measure CHQM may be at least one of a SINR, a RSRQ, and a RSRP.

At 216 a hypothetical error rate for the control channel CCH is determined based on the channel quality measure CHQM determined in step 214. The hypothetical error rate may be the hypothetical BLER associated with the control channel CCH.

At 218 a beam link failure is declared or not for the serving beam link based on the hypothetical error rate determined in step 2016 and the configuration for the control channel CCH as previously described.

At 220 a beam link failure recovery procedure is started if a beam link failure has been declared in step 218.

Figure 6:
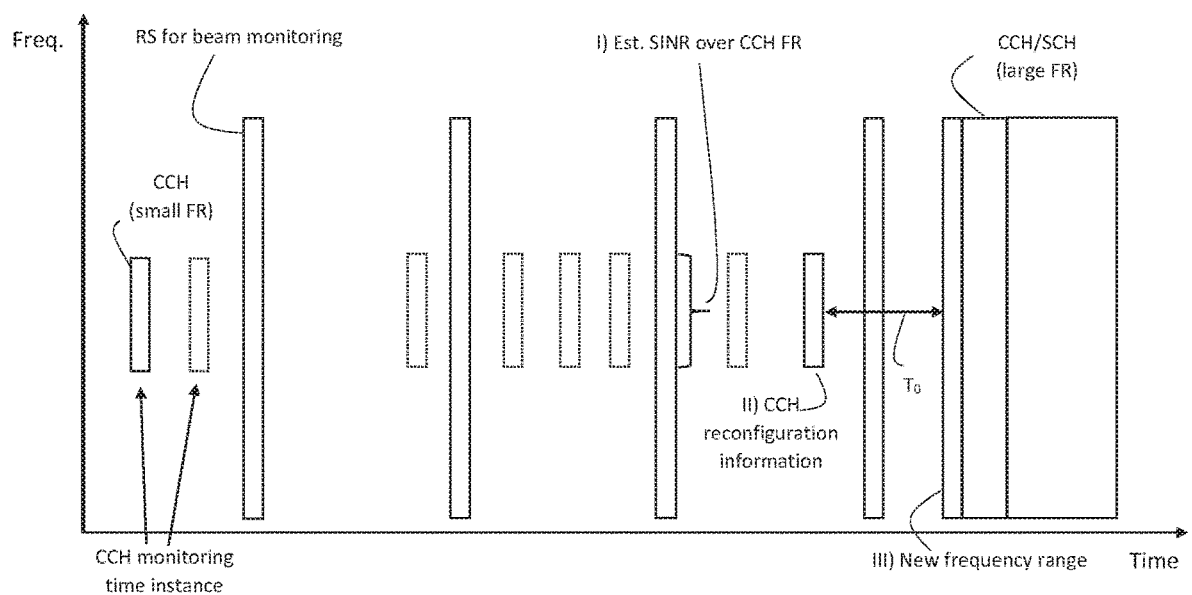
FIG. 6 illustrates further aspects of the disclosure.

FIG. 6 illustrates further aspects of the disclosure. The x-axis shows time and the y-axis shows frequency in FIG. 6.

Further, the small frequency ranges FRs illustrates control channel CCH monitoring time instances of which the dotted small rectangles (covering a small frequency range) are to be monitored by the receiving device 100 whilst the continuous small rectangles include actual control information to the receiving device 100. The reference signals RSs for beam monitoring are also shown in FIG. 6 illustrated as larger continuous rectangles covering a larger frequency range. It can also be noted that the control channel CCH (e.g. PDCCH) and the shared channel SCH (e.g. PDSCH) can have different frequency ranges FRs, denoted small and large FRs, respectively, in FIG. 6. Furthermore, it is also illustrated how the SINR is estimated over a configured control channel CCH frequency range for beam monitoring, see I in FIG. 6. The estimated SINR is used for determining a hypothetical error rate as previously described. In case a large amount of data is allocated to the receiving device 100, the network node transmits frequency range reconfiguration information to the receiving device 100 (such as mentioned instruction in connection with FIG. 1) in the control channel CCH, see II in FIG. 6. The receiving device 100, after having decoded the control channel information adapts its radio receiver frequency range to the new wide frequency range and receives data in that frequency range. In order for the receiving device 100 to be able to retune its radio receiver a time delay of $T_0$ between the control channel CCH reconfiguration information and the adaptation to the new wide frequency range is needed. In other scenarios, the control channel CCH may be configured on different centre frequencies and may also have different configured frequency ranges and hence the receiving device 100 in this case needs to estimate the SINR or a corresponding channel quality metric over respective control channel CCH frequency range prior to determining the metric associated with the detection reliability of the control channel CCH.

Figure 8:
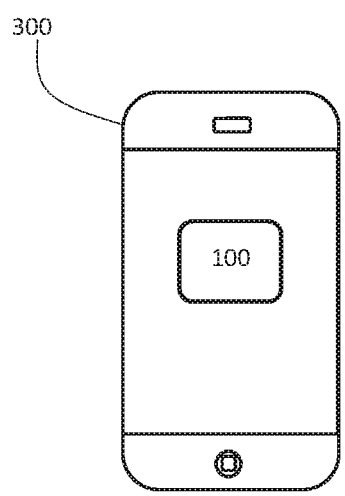
FIG. 8 shows a client device according to an embodiment of the disclosure.

FIG. 8 shows a client device 300 according to an embodiment of the disclosure. The client device 300 includes a receiving device 100 according to embodiments of the disclosure. The client device 300 herein may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in the present context may be, for example, portable, pocket-storable, hand-held, computer-included, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

In further embodiments of the disclosure, the serving beam link is a beam pair link BPL including a transmission beam of a remote transmission point and a corresponding receiving beam of the client device 300.

Figure 9:
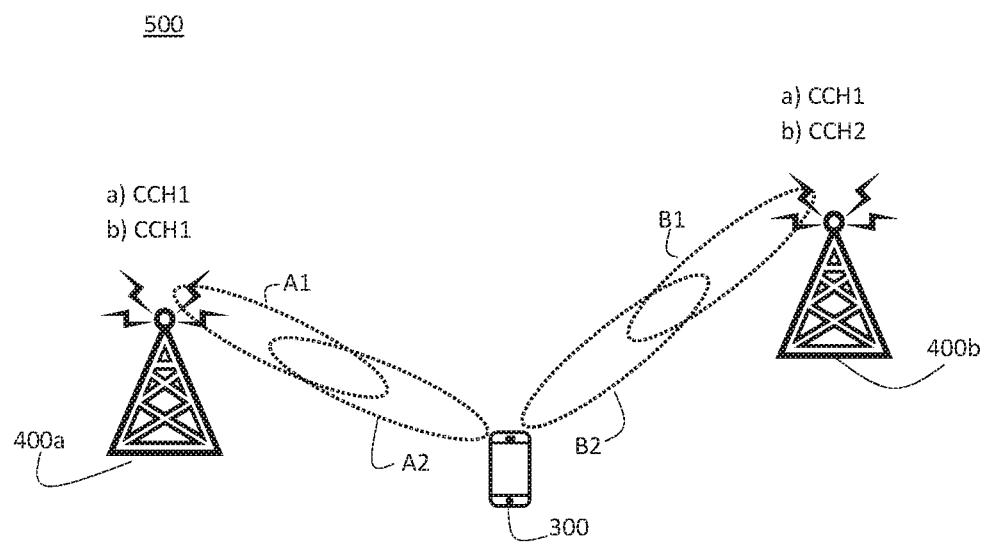
FIG. 9 illustrates different control channel scenarios in a wireless communication system.

FIG. 9 illustrates yet further implementations of the disclosure in a wireless communication system 500. As previously mentioned, the transmission scheme for the control channel CCH may be considered for declaring a beam link failure. In particular, the transmission scheme may determine a mapping function used for declaring a beam link failure. Typically, the transmission scheme may relate to transmit diversity schemes used for the control channel CCH. FIG. 9 illustrates two different transmit diversity schemes. In FIG. 9 two different base stations, namely 400a and 400b, are transmitting transmission beam links A1 and B1, respectively, to a client device 300. The respective reception beams A2 and B2 of the client device 300 are also shown in FIG. 9.

In example a) of FIG. 9 the transmission beam links A1 and B1 are associated with the same control channel CCH, i.e. CCH1. For instance, if the configured control channel CCH transmission scheme is such that the client device 300 can combine the control channel CCH information from a plurality of serving beam links (i.e. same control channel CCH transmitted over several serving beam links) a sum SINR value or a maximum SINR value over the plurality of serving beam links may be used for declaring a beam link failure. Since it is the same control information transmitted in both beam links A1 and B1, the receiving device 100 can coherently combine the soft values of the control channel which means that the sum SINR value is a good indication of the radio channel quality of the control channel CCH. However, in case the receiving device 100 cannot coherently combine the soft bits of the control channel CCH, the best of beam links A1 and B1 indicates the performance and hence the maximum SINR value is the best indication of the radio channel quality of the control channel CCH in this case.

In example b) of FIG. 9, the transmission beam links A1 and B1 are associated with different control channels CCHs, i.e. CCH1 and CCH2, respectively. In this case, the client device 300 cannot combine the control channel CCH information transmitted from the different base stations since different control channels CCHs are associated with different serving beam links. Therefore, other mapping functions may be applicable for declaring a beam link failure. For example, the minimum SINR value over the serving beam links can be used in this respect since both beam links A1 and B1 need to be monitored and hence the performance is set by the worst beam link in this case.

Furthermore, any method according to embodiments of the disclosure may be implemented in a computer program, having code means, which when run by processing means causes the processing means to execute the steps of the method. The computer program is included in a computer readable medium of a computer program product. The computer readable medium may include essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the receiving device 100 and the client device 300 includes the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor(s) of the receiving device 100 and the client device 300 may include, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry including a plurality of processing circuits, such as, e.g., any, some or all of the ones mentioned above. The processing circuitry may further perform data processing functions for inputting, outputting, and processing of data including data buffering and device control functions, such as call processing control, user interface control, or the like.

Finally, it should be understood that embodiments of the disclosure are not limited to the embodiments described above, but also relates to and incorporates all embodiments within the scope of the appended independent claims.

What is claimed is:

1. A receiving device for a wireless communication system, the receiving device comprising at least one processor, the receiving device being configured to:
monitor a reference signal associated with a control channel, the control channel being associated with a serving beam link;
determine a channel quality measure based on the reference signal; and
declare a beam link failure for the serving beam link based on a comparison of the channel quality measure to a channel quality threshold value,
wherein the channel quality threshold value is dependent on a configuration of the control channel, each configuration of the control channel corresponding to a specific channel quality threshold value.

2. The receiving device according to claim 1, wherein the channel quality threshold value is an error rate threshold value, wherein the receiving device is configured to:
determine a hypothetical error rate for the control channel based on the channel quality measure and the configuration of the control; and
declare the beam link failure for the serving beam link based on a comparison of the hypothetical error rate to the error rate threshold value.

3. The receiving device according to claim 2, wherein the error rate threshold value is dependent on the configuration of the control channel.

4. The receiving device according to claim 2, wherein the hypothetical error rate is a hypothetical block error rate for the control channel.

5. The receiving device according to claim 1, wherein the control channel is associated with a plurality of serving beam links comprising the serving beam link, and wherein the receiving device is configured to declare the beam link failure for the plurality of serving beam links further based on a number of serving beam links in the plurality of serving beam links.

6. The receiving device according to claim 1 being configured to declare the beam link failure for the serving beam link further based on a frequency range of the reference signal.

7. The receiving device according to claim 1 being configured to monitor the reference signal in a same frequency range as a frequency range of the control channel.

8. The receiving device according to claim 7 being configured to:
receive an instruction to monitor the reference signal in an updated frequency range; and monitor the reference signal in the updated frequency range in response to receiving the instruction.

9. The receiving device according to claim 1 being configured to declare the beam link failure for the serving beam link further based on a service class associated with the serving beam link.

10. The receiving device according to claim 1, wherein the configuration of the control channel is at least one of a frequency range of the control channel or a transmission scheme of the control channel.

11. The receiving device according to claim 1, wherein the channel quality measure is at least one of: a signal-to-interference and noise ratio, a reference signal received quality, or a reference signal received power.

12. The receiving device according to claim 1, wherein the reference signal is at least one of: channel state information reference symbols, demodulation reference signals for a new radio physical downlink control channel, demodulation reference signals for a new radio physical broadcast channel, a new radio secondary synchronisation signal, a new radio primary synchronisation signal, or reference symbols for at least one of time and frequency tracking.

13. The receiving device according to claim 1, the receiving device being configured to:
   determine a hypothetical error rate for the control channel based on the channel quality measure and a configuration of the control channel by selecting a channel quality to hypothetical error rate mapping curve based on the configuration of the control channel and determining the hypothetical error rate from the channel quality to hypothetical error rate mapping curve based on the channel quality measure; and
   declare a beam link failure for the serving beam link based on the hypothetical error rate for the control channel.

14. A client device for a wireless communication system, the client device comprising a receiving device comprising at least one processor, wherein the receiving device is configured to:
   monitor a reference signal associated with a control channel, the control channel being associated with a serving beam link;
   determine a channel quality measure based on the reference signal; and
   declare a beam link failure for the serving beam link based on a comparison of the channel quality measure to a channel quality threshold value,
   wherein the channel quality threshold value is dependent on a configuration of the control channel, each configuration of the control channel corresponding to a specific channel quality threshold value.

15. The client device according to claim 14, wherein the control channel is a common control channel for a plurality of client devices, comprising the client device, or a dedicated control channel for a single client device.

16. The client device according to claim 14, wherein the serving beam link is a beam pair link comprising a transmission beam of a remote transmission point and a corresponding receiving beam of the client device.

17. A method for a receiving device for a wireless communication system, the method comprising:
   monitoring a reference signal associated with a control channel, the control channel being associated with a serving beam link;
   determining a channel quality measure based on the reference signal; and
   declaring a beam link failure for the serving beam link based on a comparison of the channel quality measure to a channel quality threshold value,
   wherein the channel quality threshold value is dependent on a configuration of the control channel, each configuration of the control channel corresponding to a specific channel quality threshold value.

18. A non-transitory computer readable medium comprising a computer program with program code, which when executed by a processor, is configured to perform a method for a receiving device for a wireless communication system, the method comprising:
   monitoring a reference signal associated with a control channel, the control channel being associated with a serving beam link;
   determining a channel quality measure based on the reference signal; and
   declaring a beam link failure for the serving beam link based on a comparison of the channel quality measure to a channel quality threshold value,
   wherein the channel quality threshold value is dependent on a configuration of the control channel, each configuration of the control channel corresponding to a specific channel quality threshold value.

* * * * *